(12) United States Patent
Lee et al.

(10) Patent No.: US 7,976,394 B2
(45) Date of Patent: Jul. 12, 2011

(54) GAME SUPPORTING APPARATUS FOR A MOBILE COMMUNICATION TERMINAL

(75) Inventors: Younggun Lee, Gyeonggi-do (KR); Junyong Jung, Seoul (KR); Hoojong Kim, Seoul (KR); Inseong Hwang, Seoul (KR)

(73) Assignee: SK Telelcom Co., Ltd., Seoul (KR)

( * ) Notice: Subject to any disclaimer, the term of this patent is extended or adjusted under 35 U.S.C. 154(b) by 1048 days.

(21) Appl. No.: 11/813,013

(22) PCT Filed: Feb. 3, 2005

(86) PCT No.: PCT/KR2005/000328
§ 371 (c)(1),
(2), (4) Date: Jun. 28, 2007

(87) PCT Pub. No.: WO2006/073220
PCT Pub. Date: Jul. 13, 2006

(65) Prior Publication Data
US 2008/0119290 A1  May 22, 2008

(30) Foreign Application Priority Data

Jan. 4, 2005  (KR) .................. 10-2005-0000518

(51) Int. Cl.
*A63F 9/24* (2006.01)
(52) U.S. Cl. ............... 463/47; 463/39; 463/42
(58) Field of Classification Search ........... 463/47, 463/39, 42
See application file for complete search history.

(56) References Cited

U.S. PATENT DOCUMENTS

| 2003/0119553 A1 | 6/2003 | Chuang |
| 2003/0148797 A1* | 8/2003 | Huang .......................... 455/573 |
| 2004/0063464 A1 | 4/2004 | Akram et al. |
| 2004/0116183 A1* | 6/2004 | Prindle ........................ 463/42 |
| 2008/0300055 A1* | 12/2008 | Lutnick et al. .................. 463/39 |
| 2009/0231485 A1* | 9/2009 | Steinke ..................... 348/425.1 |

FOREIGN PATENT DOCUMENTS

| JP | 09-237145 | 9/1997 |
| JP | 11-196159 | 7/1999 |
| JP | 2001-352373 | 12/2001 |
| KR | 288185 | 8/2002 |
| KR | 2004-16208 | 7/2004 |
| WO | 2004/112268 | 12/2004 |

OTHER PUBLICATIONS

International Search Report for 10-2005-000518.
Office Action dated Jun. 3, 2009, for Japanese application No. 2007-548046.

* cited by examiner

*Primary Examiner* — Pierre E Elisca
(74) *Attorney, Agent, or Firm* — Lowe Hauptman Ham & Berner LLP (57) ABSTRACT

The invention relates to an apparatus for providing a user interface for a game performed on a mobile communication terminal. The invented apparatus supports a network game using a mobile communication terminal by providing network game functions through voice communications, various operational and manipulation functions, realistic video/sound presentation and a support for a mass capacity game. The invented apparatus enables on-line network game through mobile data communication network as well as voice communications and it provides various and improved user interface for a game using mobile communication terminals.

14 Claims, 5 Drawing Sheets

GAME SUPPORTING APPARATUS FOR A MOBILE COMMUNICATION TERMINAL

CROSS REFERENCE TO RELATED APPLICATION

This application is the National Phase application of International Application No. PCT/KR2005/000328, filed Feb. 3, 2005, which designates the United States and was published in English. This application, in its entirety, is incorporated herein by reference.

TECHNICAL FIELD

The present invention relates, in general, to an apparatus for providing a user interface for games played on a mobile communication terminal and, more particularly, to a game support apparatus for a mobile communication terminal, which can support network games through voice communication with the other players, various manipulation, realistic images/sounds, and a large-size game.

BACKGROUND ART

Recently, it is possible for users to enjoy games using mobile communication terminals with the help of the development of mobile communication terminal technology and content-related technology.

Generally, in the state in which a game which has been downloaded using a wireless Internet function and installed on a mobile communication terminal, a user moves game characters by manipulating key buttons that are placed on the front portion of the main body of the mobile communication terminal. As a result, the game is executed on the mobile communication terminal, that is, game images are displayed on a display unit and game sounds are output through a speaker.

However, in the prior art, users cannot be provided with sufficient circumstances to enjoy games due to system resource and user interface limitations.

That is, a plurality of games or a large-size game cannot be stored and cannot be executed in memory due to the limited resources of the mobile communication terminal, for example, low-capacity memory, three-dimensional game images cannot be processed due to a low-performance Liquid Crystal Display (LCD) controller, and high-quality game sounds cannot be displayed due to a low-performance audio codec.

Furthermore, high-quality game images cannot be displayed on the limited user interface of the mobile communication terminal, for example, a small-size LCD (the detailed display of characters is impossible), high-quality game sounds cannot be output using a low-power speaker, and game characters and events cannot be manipulated and selected in various ways due to small-size key buttons.

Meanwhile, since console game devices, such as Play Station (PS) developed by Sony Corp. of Japan and X-Box developed by Microsoft Corp. of the United States, are excessively large in size, the portability of the console game devices is poor, so that it is difficult for users to enjoy games while moving. The console game devices cannot support network games between a plurality of users because a wireless data communication function is not provided.

Particularly, in the case of network games played in teams, users can better enjoy the games if the users exchange voice communications with each other. However, since the above-mentioned console game devices do not provide voice communication, they cannot meet users' desires for games.

DISCLOSURE OF THE INVENTION

Accordingly, the present invention has been made keeping in mind the above problems occurring in the prior art, and an object of the present invention is to provide an apparatus, which is capable of providing support so that a user can enjoy network games while exchanging voice communication with the other players, can perform various game manipulation using external devices, such as a joystick, can be provided with realistic game images and sounds through a TeleVision (TV) and a high-power speaker, and can enjoy various games and a large-size game.

BEST MODE FOR CARRYING OUT THE INVENTION

Embodiments of the present invention are described in detail with reference to the accompanying drawings below.

Figure 1:
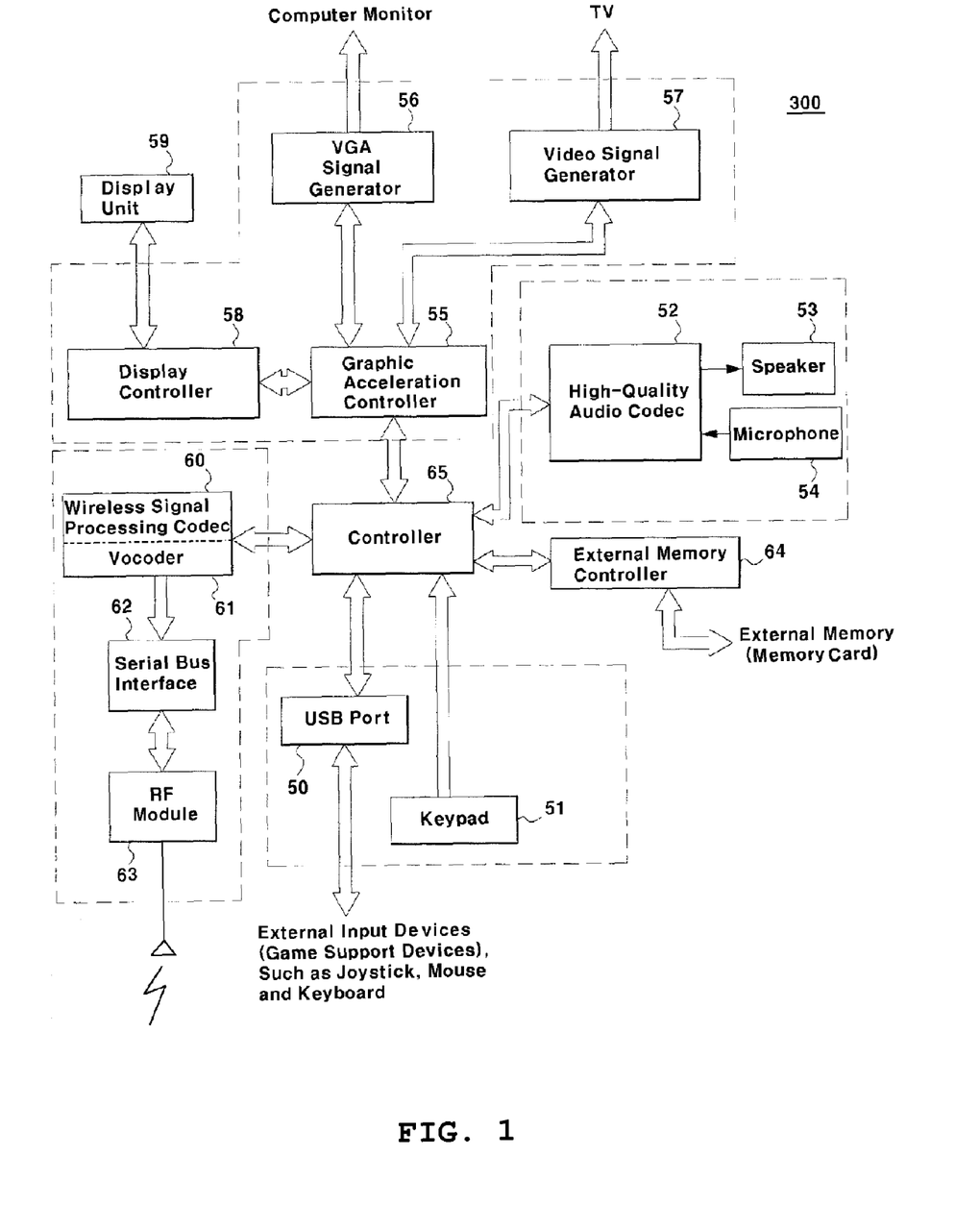
FIG. 1 is a block diagram showing the construction of a game support apparatus for a mobile communication terminal according to an embodiment of the present invention.

FIG. 1 is a block diagram showing the construction of a game support apparatus for a mobile communication terminal according to an embodiment of the present invention.

As shown in FIG. 1, the game support apparatus 300 for a mobile communication terminal (hereinafter referred to as a "game support apparatus") according to the embodiment of the present invention is included in a mobile communication terminal 400, and includes a Universal Serial Bus port (USB) port 50, a keypad 51, a high-quality audio codec (wideband stereo codec) 52, a speaker 53, a microphone 54, a graphic acceleration controller 55, a Video Graphics Array (VGA) signal generator 56, a video signal generator 57, a display controller 58, a display unit 59, a wireless signal processing codec (a Radio Link Protocol (RLP) codec) 60, a vocoder 61, a Serial Bus Interface (SBI) 62, a Radio Frequency (RF) module 63, an external memory controller 64, and a control unit 65.

The mobile communication terminal 400 supports a user's game manipulation, realistic images/sounds, network games and a large-size game using the game support apparatus 300 that is contained in the mobile communication terminal 400 itself. Meanwhile, the mobile communication terminal 400 or a general mobile communication terminal may support the user's game manipulation, realistic images/sounds, network games and a large-size game while operating in conjunction with the game support apparatus of FIG. 3 that will be described later, which will be described in conjunction with relevant components in more detail.

The USB port 50 transmits and receives command signals to and from external devices (for example, a keyboard, a joystick, a mouse and the like). The keypad 51 generates the command signals (local command signals) of the mobile communication terminal itself. The USB port 50 and the keypad 51 are referred to as an input/output unit. When the external devices are connected to the USB port 50, the input function of the keypad 51 is handed over to the external devices.

The USB port 50 receives the command signals (game manipulation signals) from the external devices (for example, a keyboard, a joystick, a mouse and the like) that generate signals for manipulating game characters, events, etc. that are executed in the mobile communication terminal 400.

The keypad 51 is integrated with the main body of the mobile communication terminal 400, and includes numeric key buttons, direction key buttons and function key buttons. Meanwhile, it is preferred that a General Purpose Input/Output (GPIO) be included between the keypad 51 and the control unit 65, so that key signals can be generated by the manipulation of buttons of the keypad 51 and the generated key signals can be provided to the control unit 65.

The high-quality audio codec (wideband stereo codec) converts analog voice signals (preferably, a user's voices), which are input from the microphone, into digital voice data in a wideband manner (for example, a method of processing all wideband audio signals in a range of 50 to 7000 Hz), and converts digital audio data (preferably, the other player's voices and game sounds), which have been output from the control unit 65, into analog audio signals in the wideband manner.

The speaker 53 outputs the analog audio signals to the outside, and the microphone detects the analog voice signals generated from the outside. The high-quality audio codec (wideband stereo codec) 52, the speaker 53 and the microphone 54 described above are referred to as an audio processing unit.

In addition, it is preferred that the speaker 53 be implemented in the form of a high-power right/left speaker arrangement (a stereo function is implemented) in which an amplifier (not shown) is provided (earphones may be used). The microphone 54 may be implemented using an external headset that is integrated with the mobile communication terminal 400 or detachably attached to the mobile communication terminal 400.

The graphic acceleration controller 55 graphically accelerates graphic data (game images) on an external display, and controls the driving of the VGA signal generator 56, the video signal generator 57 and the display controller 58 in conformity with the external display connected to the mobile communication terminal 400, so that it generates graphic signals that are suitable for a local display and an external display and correspond to the game images. Such a graphic acceleration controller 55 may be implemented using a three-dimensional graphic acceleration chip on which a Graphics Processing Unit (GPU) and frame buffer memory are mounted.

For example, when a computer monitor is connected to a VGA output terminal (not shown), the graphic acceleration controller 55 hands over the output of graphic data to the VGA output terminal, and commands the VGA signal generator 56 to generate the VGA signals corresponding to the graphic data by driving the VGA signal generator 56. When a TV is connected to an RCA output terminal (not shown), the graphic acceleration controller 55 hands over the output of the graphic data to the RCA output terminal, and commands the video signal generator 57 to generate video composite signals corresponding to the graphic data by driving the video signal generator 57. Meanwhile, when no external devices are connected to the VGA output terminal and the RCA output terminal, the graphic acceleration controller 55 drives the display controller 58 using the existing display method of the mobile communication terminal.

The VGA signal generator 56 generates the VGA signals corresponding to the graphic data (game images) under the control of the graphic acceleration controller 55. Such VGA signals are output to the external computer monitor through the VGA output terminal.

The video signal generator 57 generates the video composite signals corresponding to the graphic data (game images) under the control of the graphic acceleration controller 55. Such video composite signals are output to the external TV through the RCA output terminal.

In particular, the graphic acceleration controller 55 processes game images and game image-related data and, specifically, stores graphic data and graphic data-related variables, which are generated by the execution of a game program, in frame buffer memory and then processes them.

Meanwhile, the graphic acceleration controller 55 graphically accelerates three-dimensional (3D) image related data after its GPU has temporarily stored the data in the frame buffer memory at the request of the control unit 65 for the performance of the graphic acceleration function, and allows results to be displayed on the display unit 59, the computer monitor or the TV. The graphic acceleration controller 55, the VGA signal generator 56, the video signal generator 57, the display controller 58 and the display unit 59 described above are referred to as a graphic processing unit.

Recently, mobile communication terminals provided with such a graphic acceleration function (so-called "three-dimensional acceleration chip," for example, the Imageon 2300 acceleration chip of ATI Inc.) are collectively called as Graphic Instruction Graphic Acceleration (GIGA) terminals.

The wireless signal processing codec 60, the vocoder 61, the SBI 62 and the RF module 63 are referred to as a wireless communication unit. The wireless communication unit exchanges data communication with a specific server (preferably, a game server) through a data channel (data call), and voice communication with a specific mobile communication terminal (preferably, the mobile communication terminal of a user who enjoys the same network game) through a voice channel (voice communication).

The RF module 63 converts data (game-related data and the user's voice), which have been input from the SBI 62, into RF signals and wirelessly transmits the converted RF signals through an antenna, and outputs RF signals, which have been wirelessly received through the antenna, to the SBI 62.

The SBI 62 converts parallel data into serial data, and converts serial data into parallel data.

The vocoder 61 compresses analog voice signals (the user's voices and the other player's voice), which have been transmitted and received by a specific mobile communication terminal through a voice channel, to digital voice data.

The wireless signal processing codec 60 converts data, which are transmitted to a specific server through the data channel, into data having a format that is suitable for a wireless data network, and data, which have been received from the specific server through the data channel, into original format data. In addition, the wireless signal processing codec 60 may be constructed in a form in which the vocoder 61 is integrated with a wireless signal processing codec.

Meanwhile, the mobile communication terminal 400, preferably, the game support apparatus 300, may further include external memory capable of storing a large amount of game data. To this end, the external memory controller 64 and a memory slot (not shown) are included.

The external memory controller 64 controls the read and write of data to and from the external memory (for example, NAND type memory, a Multi-Media Card (MMC; compact flash type memory), a Secure Digital (SD) memory card, or a USB Flash memory Device (UFD)) that is inserted into the slot.

In addition, a common standard interface module is preferably mounted on the external memory controller 64 to detect various types of external memory.

The control unit 65 takes charge of overall control of the execution of a game program. For example, the control unit 65 executes a game program corresponding to data that have been transmitted and received by the game server through the wireless data network (the control unit 65 specifies the other player's game manipulation signals within a network game, and transmits the user's game manipulation signals to the game server), performs tasks, such as character movement and event generation, corresponding to the game manipulation signals that are input from the keyboard, the joystick, the mouse or the keypad 51 during the execution of the game, and generates game images (graphic data) and/or game sounds (audio data) corresponding to the results of the game execution.

In particular, to support a network game through voice communication with the other player, the control unit 65 establishes a data channel with the specific game server and establishes a voice channel with the specific mobile communication terminal, according to the execution of the game program and the game manipulation signals. The control unit 65 may be implemented using a microprocessor, such as an ARM7 or an ARM9.

Figure 2:
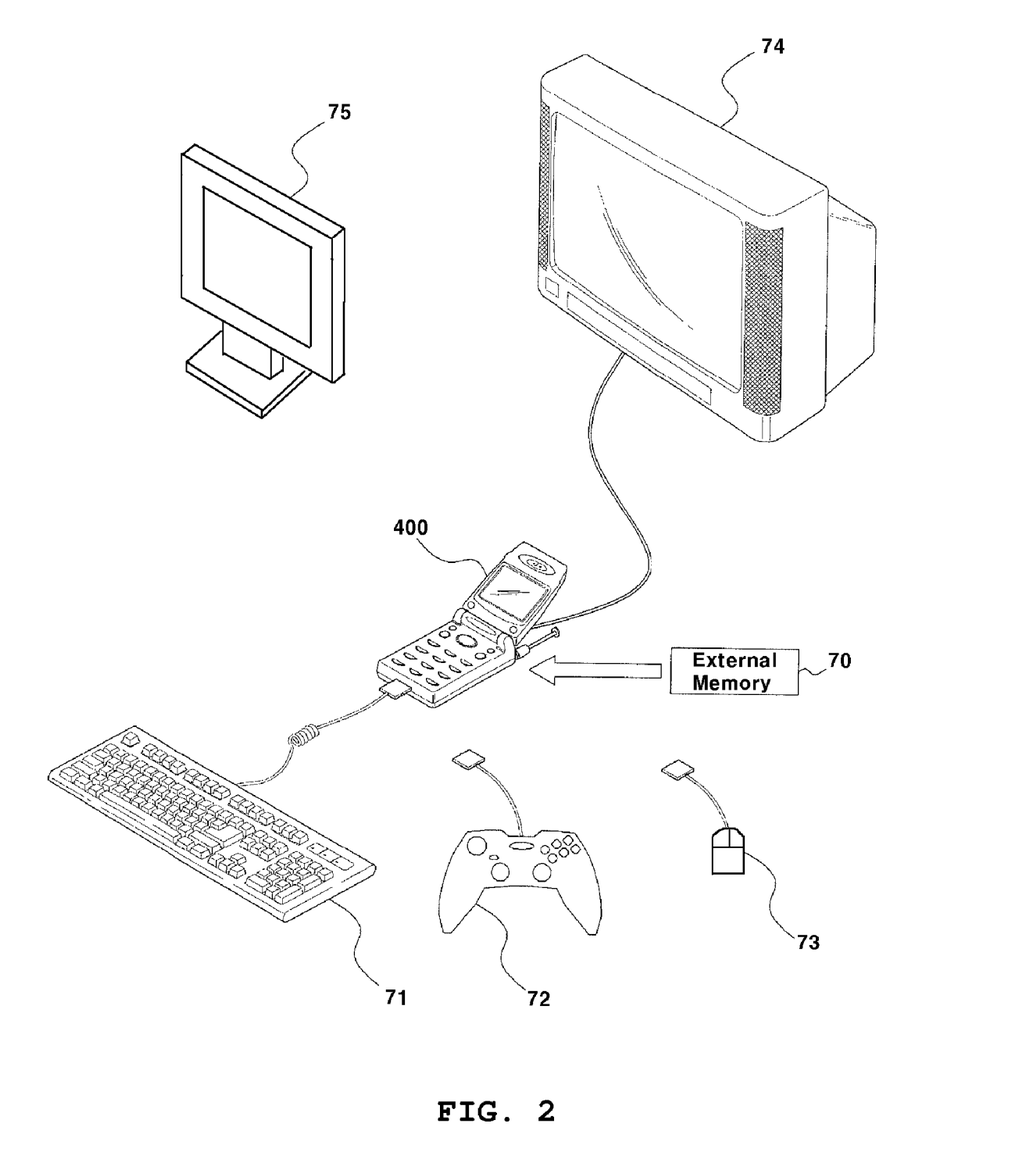
FIG. 2 is a view illustrating an embodiment of the mobile communication terminal and the external devices shown in FIG. 1.

FIG. 2 is a view illustrating an embodiment of the mobile communication terminal and the external devices shown in FIG. 1.

In FIG. 2, a mobile communication terminal 400, external memory 70, a keyboard 71, a joystick 72, a mouse 73, a TV 74 and a computer monitor 75 are illustrated.

As shown in FIG. 2, to enjoy a game that has been installed on the mobile communication terminal, a user manipulates the game using the keyboard 71, the joystick 72 or the mouse 73 while viewing game images displayed on the TV 74 or the computer monitor 75 in the state in which the keyboard 71, the joystick 72 or the mouse 73 is connected to the USB port 50, the TV 74 is connected to the RCA output terminal using an RCA connector (cable), and the computer monitor 75 is connected to the VGA output terminal using a VGA connector (cable).

Furthermore, the user inserts the external memory 70 into a memory slot, and then retrieve and execute a game that has been stored in the external memory 70, or stores certain data in the external memory 70.

Figure 3:
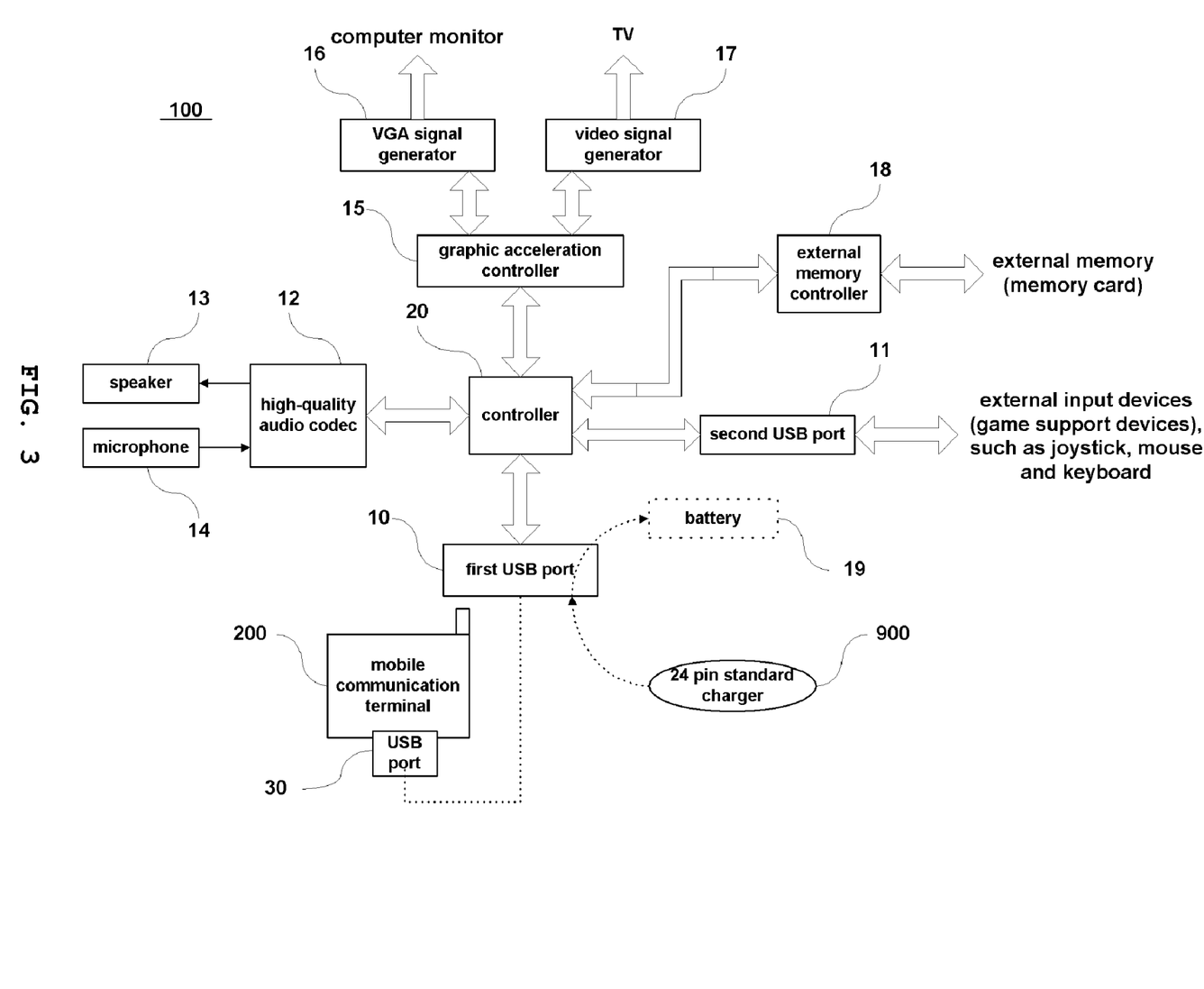
FIG. 3 is a block diagram showing the construction of a game support apparatus for a mobile communication terminal according to another embodiment of the present invention.

FIG. 3 is a block diagram showing the construction of a game support apparatus for a mobile communication terminal according to another embodiment of the present invention.

The game support apparatus 100 for a mobile communication terminal (hereinafter referred to as a "game support apparatus") according to another embodiment of the present invention inputs the game manipulation signals of external devices to a mobile communication terminal 10, processes graphic data and audio data that are input from the mobile communication terminal 10, and supports the read and write of data to and from the external memory while operating in conjunction with the above-described mobile communication terminal 400 of FIG. 1 or a general mobile communication terminal 200 (which will be described in detail with reference to FIG. 4) [so-called "game kit function"].

Preferably, a program for operating in conjunction with the game support apparatus 100 is installed on the mobile communication terminal 200 or 400. With the program, communication is exchanged between the game support apparatus 100 and the mobile communication terminal 10, and the mobile communication terminal 200 or 400 detects connection with the game support apparatus 100, and hands over a game manipulation function using the external device, a game sound output function, a game image output function and an external memory control function, to the mobile support apparatus 100 while performing a network game support function.

As shown in FIG. 3, the game support apparatus 100 for a mobile communication terminal includes a first USB port 10, a second USB port 11, a high-quality audio codec (wideband stereo codec) 12, a speaker 13, a microphone 14, a graphic acceleration controller 15, a VGA signal generator 16, a video signal generator 17, an external memory controller 18, a battery 19 and a control unit 20.

The first USB port 10 is connected with the USB port 30 or 50 of the mobile communication terminal 200 or 400 through a certain data cable, and transmits and receives data, preferably, game-related data (graphic data, audio data, game manipulation signals (command signals) and game files), to and from the mobile communication terminal 200 or 400.

The second USB port 11 receives the game manipulation signals from the external device (for example, a keyboard, a joystick, a mouse, etc.). When the external device is connected to the second USB port 11, the input function of the keypad of the mobile communication 200 or 400 is handed over to the external device.

The high-quality audio codec (wideband stereo codec) 12 converts analog voice signals (preferably, the user's voices), which have been input from the microphone 14, into digital voice data in a wideband manner (for example, a method of processing all wideband audio signals in a range of 50 to 7000 Hz), and converts digital audio data (preferably, the other player's voices and game sounds), which have been received from the mobile communication terminal 200 or 400 under the control of the control unit 20, into analog audio signals in the wideband manner.

The speaker 13 outputs the analog audio signals to the outside, and the microphone 14 detects the analog voice signals generated from the outside. In addition, it is preferred that the speaker 53 be implemented in the form of a high-power right/left speaker arrangement (a stereo function is implemented) in which an amplifier (not shown) is provided (earphones may be used). The microphone 14 may be implemented using an external headset that is integrated with the game support apparatus 100 or detachably attached to the game support apparatus 100.

The graphic acceleration controller 15 graphically accelerates graphic data (game images), which have been received from the mobile communication terminal 200 or 400, on the external display, and controls the driving of the VGA signal generator 16 and the video signal generator 17 in conformity with the external display connected to the game support apparatus 100, so that it generates graphic signals that are suitable for the external display and correspond to the game images. The graphic acceleration controller 15 may be implemented using a three-dimensional graphic acceleration chip on which GPU and frame buffer memory are mounted.

For example, when a computer monitor is connected to a VGA output terminal (not shown), the graphic acceleration controller 15 hands over the output of the graphic data to a VGA output terminal, and commands the VGA signal generator 16 to generate VGA signals corresponding to the graphic data by driving the VGA signal generator 16. When a TV is connected to an RCA output terminal (not shown), the graphic acceleration controller 15 hands over the output of the graphic data to the RCA output terminal, and commands the video signal generator 17 to generate video composite signals corresponding to the graphic data by driving the video signal generator 17. Meanwhile, when no external devices are connected to the VGA output terminal and RCA output terminal of the graphic acceleration controller 15, the game images are displayed on the display unit of the mobile communication terminal 200 or 400.

The VGA signal generator 16 generates the VGA signals corresponding to the graphic data (game images) under the control of the graphic acceleration controller 15. Such VGA signals are output to the external computer monitor through the VGA output terminal.

The video signal generator 17 generates the video composite signals corresponding to the graphic data (game images) under the control of the graphic acceleration controller 15. Such video composite signals are output to the external TV through the RCA output terminal.

In particular, the graphic acceleration controller 15 processes game images and game image-related data and, specifically, stores graphic data and related variables, which are generated by the execution of a game program, in frame buffer memory and then processes them.

Meanwhile, the graphic acceleration controller 15 causes its GPU to temporarily stores data for three-dimensional image in the frame buffer memory and then graphically accelerate the stored data, and allows the result to be displayed on the corresponding screen, such as a computer monitor or a TV.

Meanwhile, the game support apparatus 100 may further include external memory capable of storing a large amount of game data. To this end, an external memory controller 18 and a memory slot (not shown) are included.

The external memory controller 18 controls the read and write of data to and from the external memory (for example, NAND type memory, a Multi-Media Card (MMC; compact flash type memory), a Secure Digital (SD) memory card, or a USB Flash memory Device (UFD)) that is inserted into the memory slot.

In addition, a common standard interface module is preferably mounted on the external memory controller 18 to detect various types of external memory.

Meanwhile, the game support apparatus 100 may be driven using power that is supplied from a previously mounted battery 19 (for example, a dry cell or a charging battery) or from the mobile communication terminal 200 or 400 via the first USB port 10.

In the case of driving the game support apparatus 100 using the charger, the user can drive the game support apparatus 100 by connecting an adapter (or a Korean 24 pin standard charger 900) to the charge port of the game support apparatus 100, preferably, the first USB port 10, and then converting Alternating Current (AC) power, which is supplied from a wall socket within a home, into Direct Current (DC) power suitable for the game support apparatus 100. In this case, the user can use the game support apparatus 100 for a long time without the need to be concerned with the power consumption of the game support apparatus 100, or can use the game support apparatus 100 at the same time as it is charged.

The control unit 20 takes charge of the overall control of the execution of the game program. That is, when being allowed to operate in conjunction with the mobile communication terminal 200 or 400 through the first USB port, the control unit 20 identifies game-related data (graphic data, audio data, game manipulation signals and game files) that have been transmitted and received by the first USB port 10, transfers the data/signals to corresponding elements and commands the elements to process the data/signals. For example, when the first USB port 10 receives graphic data from the mobile communication terminal 200 or 400, the control unit 20 causes the data to be transferred to the graphic controller 15 and processed. When the game manipulation signals of the external devices are input to the second USB port 11, the control unit 20 causes the game manipulation signals to be transferred to the mobile communication terminal 200 or 400 and processed.

Meanwhile, in the case in which the user selects a network game function using a user interface through the game support apparatus and desires to play the network game with the other player, the control unit 20 requests network game support by transmitting corresponding network game-related data to the mobile communication terminal 200 or 400. Such network game support will be described with reference to FIG. 4.

Figure 4:
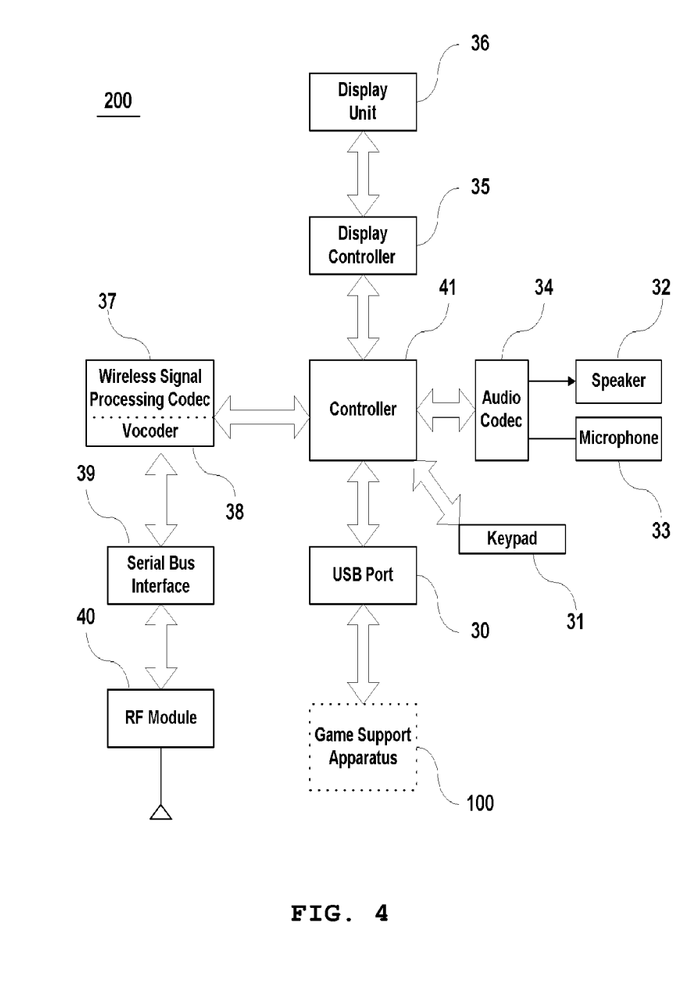
FIG. 4 is a block diagram showing the construction of the mobile communication terminal applied to FIG. 3.

FIG. 4 is a block diagram showing the construction of an embodiment of the mobile communication terminal applied to FIG. 3.

As shown in FIG. 4, the mobile communication terminal 200 applied to FIG. 3 includes a USB port 30, a keypad 31, a speaker 32, a microphone 33, an audio codec 34, a display controller 35, a display unit 36, a wireless signal processing codec (RLP codec) 37, a vocoder 38, an SBI 39, an RF module 40 and a control unit 41.

The USB port 30 takes charge of a function of transmitting and receiving data to and from the game support apparatus 100. When a network game support request, for example, a request for connection to a game server through a data channel or a call from the user of a specific mobile communication terminal through a voice channel is received, from the game support apparatus 100 through the USB port 30, a corresponding element is driven and performs the function.

The above-described network game support function is performed in a wireless communication unit that includes the wireless signal processing codec 37 and the vocoder 38, the SBI 39 and the RF module under the control of the control unit 41. Such a wireless communication unit performs data communication with a specific server (preferably, a game server) through the data channel, and performs voice communication with a specific mobile communication terminal (preferably, the mobile communication terminal of a user who enjoys the same network game) through the voice channel. Since the function of the wireless communication unit is the same as that of the above-described wireless communication unit of FIG. 1, a detailed description thereof will be omitted.

Figure 5:
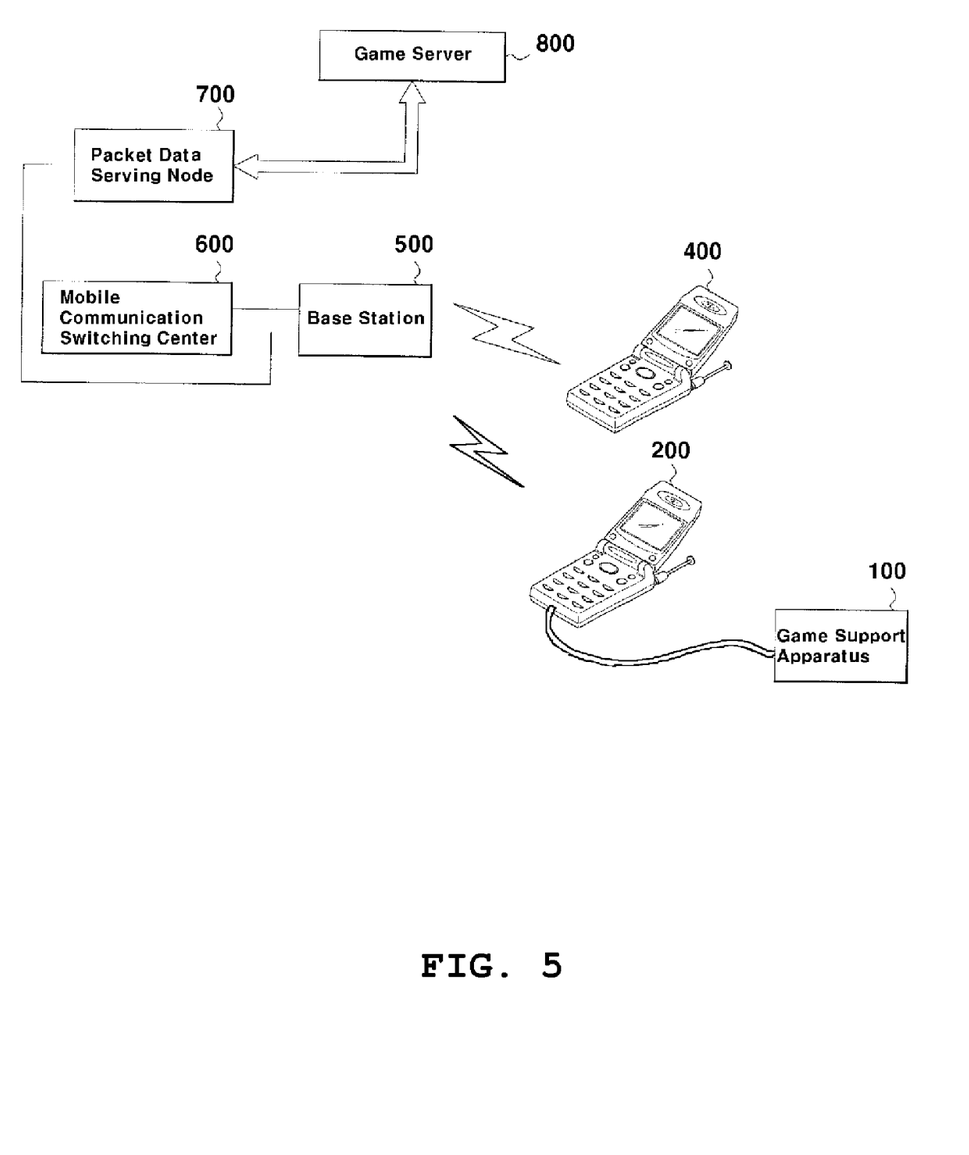
FIG. 5 is a view illustrating an embodiment of a network game service-providing communication network applied to the present invention.

FIG. 5 is a view illustrating an embodiment of a network game service-providing communication network applied to the present invention.

As shown in FIG. 5, the network game service-providing communication network applied to the present invention includes a base station 500, a mobile communication switching center 600, a packet data serving node 700 and a game server 800. Meanwhile, as described above, a terminal used for network game service includes the mobile communication terminal 400 in which the game support apparatus 300 shown in FIG. 1 is provided, or the mobile communication terminal 300 that operates in conjunction with the game support apparatus 100 shown in FIGS. 3 and 4.

The packet data serving node 700 is based on Point-to-Point Protocol (PPP), and allocates an Internet Protocol (IP) address to the mobile communication terminal 200 or 400. The mobile communication terminal 200 or 400 accesses the resources (game-related data, the user's game data, the other player's game data or the like) of the game server 800 through a data channel using the IP address as a parameter.

The game server 800 establishes a game network with the mobile communication terminals 200 and 400 of players who participate in a network game, and synchronizes data so that the mobile communication terminals 200 and 400 can be provided with the same game images and sounds.

The base station 500 and the mobile communication switching center 600 provide voice communication service between the mobile communication terminals 200 and 400 through a voice channel. As described above, in accordance with the present invention, a user can exchange voice communication with the other player while enjoying a network game.

For example, the user connects with the game server 800 using the mobile communication terminal 200 or 400, and can play a network game in such a way as to establish a voice channel with the mobile communication terminal 200 or 400 of the other player using the known Synchronous Voice and Data (SVD) function (a function that establishes an additional voice channel in the state in which a data channel is established) and communicate with the other player while enjoying a 3:3 network game (a kind of game method in which many people are divided into two teams and play a game in the teams). To this end, the mobile communication terminal 200 or 400 generates paging channel data for a voice channel connection, and requests the voice channel connection. Accordingly, the mobile communication switching center 600 processes the known voice channel connection.

As described above, the mobile communication terminal 200 or 400 transmits corresponding data to the game server 800 through a wireless communication terminal to synchronize game-related data, which are generated by the user's game manipulation during the execution of a network game, with game-related data, which are generated from the other player's mobile communication terminal 200 or 400.

Furthermore, the game-related data (an application program, game images, game sounds and related variables) generated from the mobile communication terminal 200 or 400 are transmitted to the game server 800. The game server 800 synchronizes the game-related data of the mobile communication terminals 200 and 400, which participate in the same game as the mobile communication terminal 200 or 400, with each other, and causes the game-related data, which are generated from one mobile communication terminal 200 or 400, to be transmitted to the other mobile communication terminal 200 or 400.

INDUSTRIAL APPLICABILITY

As described above, the present invention can output images, which are displayed on a mobile communication terminal that has superior mobility and is convenient to carry, though a TV or a computer monitor in the form of high-quality images, can output high-quality sounds, and can provide users with convenient manipulation of various games and realistic game images and sounds beyond the level of a general console game equipment by supporting a variety of external input devices, such as a joystick, a mouse and a keyboard, using a USB interface and its related input/output protocol.

Furthermore, in accordance with the present invention, users can enjoy games played in teams with more interesting and pleasure because a voice communication connection function is provided during network games. Furthermore, by supporting external memory, the present invention allows downloaded games to be stored in the external memory, or allows content to be stored in the external memory off-line and to be executed through a connection with the mobile communication terminal.

Furthermore, in accordance with the present invention, on-line network games can be supported through a wireless data communication network as well as voice communication, and users can be provided with an improved game environment through the support of more various user interfaces (input/output functions).

The invention claimed is:

1. A game support apparatus for a mobile communication terminal, comprising:
   a first Universal Serial Bus (USB) port connected with a first mobile communication terminal and configured to transmit and receive data and/or command signals to and from the first mobile communication terminal;
   a graphic processing unit configured to graphically accelerate graphic data, which are received from the first mobile communication terminal, on an external display, and generate signals corresponding to the graphic data in conformity with the external display;
   an audio processing unit configured to convert digital audio data, which are received from the first mobile communication terminal, into analog audio signals in a wideband manner and then output the converted analog audio signals, and detect analog voice signals from the outside and then convert the detected analog voice signals into digital voice data in the wideband manner;
   a second USB port configured to receive command signals from an external device; and
   a first control unit configured to identify the data and/or the command signals, which are received from the first USB port, and control data input/output of the graphic processing unit, the audio processing unit and the second USB port while operating in conjunction with the first mobile communication terminal.

2. The game support apparatus according to claim 1, wherein the first mobile communication terminal comprises:
   a wireless communication unit for performing data communication with a specific server through a data channel, and voice communication with a specific mobile communication terminal through a voice channel;
   a USB port for transmitting and receiving data and/or command signals to and from the game support apparatus; and
   a second control unit for executing a game-related program corresponding to data transmitted and received by the wireless communication unit, generating the graphic data and the digital audio data, which correspond to results of the execution of the game-related program and the data and/or the command signals from an input/output unit, and providing the generated graphic and digital audio data to the game support apparatus,
   wherein the second control unit of the first mobile communication terminal establishes the data channel with the specific server, and/or the voice channel with the specific mobile communication terminal by controlling the wireless communication unit according to the execution of the game-related program, and the data and/or the command signals from the input/output unit.

3. The game support apparatus according to claim 2, further comprising;
an external memory controller for controlling read and write of data to and from an external memory, the external memory being detachably attached to the game support apparatus.

4. The game support apparatus according to claim 3, wherein the graphic processing unit comprises:
a video signal generator for generating video composite signals corresponding to the graphic data received from the first mobile communication terminal;
a Video Graphics Array (VGA) signal generator for generating VGA signals corresponding to the graphic data received from the first mobile communication terminal; and
a graphic acceleration controller for graphically accelerating the graphic data, which are received from the first mobile communication terminal, on the external display, and controlling driving of the video signal generator and the VGA signal generator in conformity with the external display connected to the game support apparatus.

5. The game support apparatus according to claim 3, wherein the audio processing unit comprises:
a microphone for detecting the analog voice signals from the outside;
a speaker for outputting the analog audio signals to the outside; and
a wideband stereo codec for converting the analog voice signals, which are input from the microphone, into digital voice data in a wideband manner, and converting the digital audio data, which are received from the first mobile communication terminal, into the analog audio signals in a wideband manner.

6. The game support apparatus according to claim 1, further comprising:
a battery supplying power for driving the game support apparatus.

7. The game support apparatus according to claim 1, wherein power for driving the game support apparatus is supplied from the first mobile communication terminal.

8. A game support apparatus for a mobile communication terminal, comprising:
a wireless communication unit for exchanging data communication with a specific server through a data channel, and voice communication with a specific mobile communication terminal through a voice channel;
a graphic processing unit for graphically accelerating graphic data, which are received from a first mobile communication terminal, on an external display, and generating signals corresponding to the graphic data in conformity with the external display;
an audio processing unit for converting digital audio data, which are received from the first mobile communication terminal, into analog audio signals in a wideband manner and then outputting the converted analog audio signals, and detecting analog voice signals from an outside and then converting the detected analog voice signals into digital voice data in the wideband manner; and
a control unit for executing a game-related program corresponding to data transmitted and received by the wireless communication unit, and generating the graphic data and the digital audio data corresponding to results of executing the game-related program, and the data and/or command signals-generated from an input/output unit;
wherein the control unit establishes the data channel with the specific server, and/or the voice channel with the specific mobile communication terminal by controlling the wireless communication unit according to the execution of the game-related program and the data, and/or the command signals from the input/output unit.

9. The game support apparatus according to claim 8, further comprising:
an external memory controller for controlling read and write of data to and from an external memory, the external memory being detachably attached to the game support apparatus.

10. The game support apparatus according to claim 7, wherein the graphic processing unit comprises:
a video signal generator for generating video composite signals corresponding to the graphic data;
a Video Graphics Array (VGA) signal generator for generating VGA signals corresponding to the graphic data; and
a graphic acceleration controller for graphically accelerating the graphic data on the external display, and controlling driving of the video signal generator and the VGA signal generator in conformity with the external display connected to the game support apparatus.

11. The game support apparatus according to claim 9, wherein the audio processing unit comprises:
a microphone for detecting the analog voice signals generated from the outside;
a speaker for outputting the analog audio signals to the outside; and
a wideband stereo codec for converting the analog voice signals, which are input from the microphone, into the digital voice data in the wideband manner, and converting the digital audio data, which are received from the control unit, into the analog audio signals in the wideband manner.

12. The game support apparatus according to claim 9, wherein the wireless communication unit comprises:
a Serial Bus Interface (SBI) for converting parallel data into serial data, and serial data into parallel data;
a Radio Frequency (RF) module for converting data, which are received from the SBI, into RF signals and then wirelessly transmitting the converted RF signals through an antenna, and outputting the RF signals, which are wirelessly received through the antenna, to the SBI;
a vocoder for compressing the analog voice signals, which are transmitted and received by the specific mobile communication terminal, to the digital voice data through the voice channel; and
a wireless signal processing codec for converting data, which are transmitted to the specific server, into data having a format suitable for a wireless data network, and converting data, which are received from the specific server through the data channel, into data having an original format.

13. The game support apparatus according to claim 8, further comprising:
an input/output unit for generating the command signals.

14. The game support apparatus according to claim 13, wherein the input/output unit comprises:
a USB port for transmitting and receiving the data and/or the command signals to and from an external device; and
a keypad for generating local command signals through buttons.

* * * * *